May 22, 1951 W. W. WOOD, JR 2,554,394
MAP READING AND DEAD RECKONING TRAINER
Filed Feb. 8, 1945 4 Sheets-Sheet 1

WILLIAM W. WOOD JR.
*INVENTOR.*

BY
ATTORNEYS

WILLIAM W. WOOD JR.
INVENTOR.

May 22, 1951 W. W. WOOD, JR 2,554,394
MAP READING AND DEAD RECKONING TRAINER
Filed Feb. 8, 1945 4 Sheets-Sheet 3

WILLIAM W. WOOD JR.
*INVENTOR.*

BY
ATTORNEYS

May 22, 1951 W. W. WOOD, JR 2,554,394
MAP READING AND DEAD RECKONING TRAINER
Filed Feb. 8, 1945 4 Sheets-Sheet 4
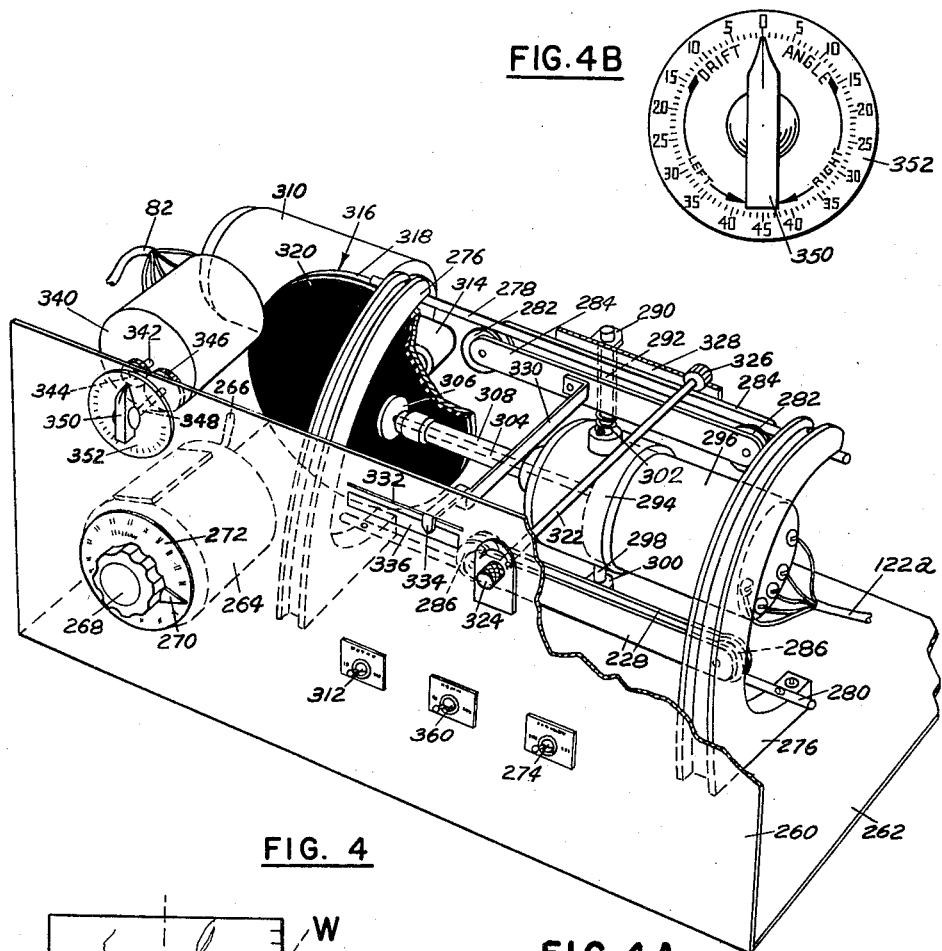
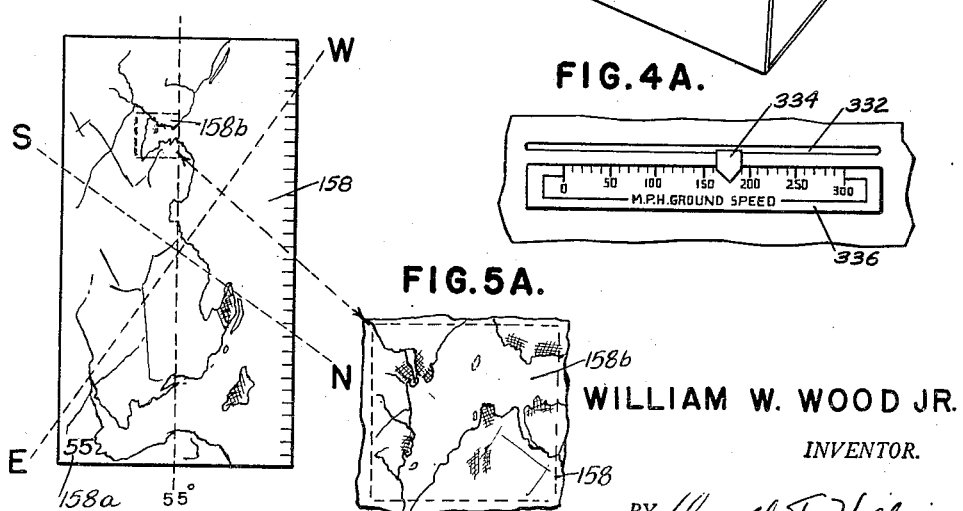
WILLIAM W. WOOD JR.
INVENTOR.
BY Donald T. Hellier
Philip S. Hopkins
ATTORNEYS Patented May 22, 1951

2,554,394

UNITED STATES PATENT OFFICE 2,554,394

MAP READING AND DEAD RECKONING TRAINER

William W. Wood, Jr., Binghamton, N. Y., assignor to Link Aviation, Inc., Binghamton, N. Y., a corporation of New York Application February 8, 1945, Serial No. 576,783

3 Claims. (Cl. 35—10.2)

This invention relates to a map reading and dead reckoning trainer and is intended for use as ground equipment in the instruction of student pilots and navigators in pilotage and dead reckoning navigation. In addition, it may be used in the familiarization of crews with both enemy and friendly terrain.

Navigation of aircraft by pilotage is defined as properly directing the course of the aircraft by comparing the landscape as seen from the plane with the symbols thereof as shown upon a chart or map. In this method of navigation difficulty is often encountered by the pilot or navigator in comparing the landscape as seen from the plane with the symbols shown upon the chart or map carried in the flight.

A primary object of this invention is to provide an apparatus having a large screen positioned to be viewed by one or more students, there being projected upon the screen a likeness of a portion of the earth's surface such as a photographic mosaic resembling the view which a pilot or navigator in a plane in actual flight would receive of the terrain if he were actually flying over the terrain corresponding to the projection upon the screen. A miniature airplane silhouette is attached to the screen, and the projection of the mosaic moves relative to the silhouette just as the real terrain moves relative to a plane in actual flight. The student pilot or navigator is preferably provided with a chart or map of the same area so that he may compare the projection upon the screen relative to the airplane silhouette with the chart or map to ascertain an assumed geographical location. The plane in which the students are assumed to be flying is always assumed to have the geographical location corresponding to the relative positions of the airplane silhouette and distinguishing features of the projected mosaic.

Dead reckoning navigation is defined as determining the location of an aircraft by computing the location of the plane with respect to a known point of departure utilizing the factors of indicated air speed, heading, wind speed, direction, altitude, barometric pressure, air temperature and elapse of time since the plane was located at the known point of departure.

When the apparatus of this invention is used in the instruction of student pilots or navigators to navigate by means of dead reckoning, my invention is provided with a simulated air speed indicator, altimeter, magnetic compass, clock and temperature indicator. By utilizing the simulated indications of these instruments as set by the instructor in conjunction with the projected mosaic valuable training in all phases of dead reckoning navigation may be received.

Other uses of my invention will be later explained.

In order that my invention may be better understood reference is made to the drawings attached hereto. In the figures, Fig. 1 is a general showing of the projection screen, the airplane silhouette being attached thereupon, the simulated instruments which may be used with this invention, the projection assembly, as well as the instructor's control box.

Fig. 4 is a view of the instructor's control panel, and

Figs. 4A and 4B are detailed views of the drift angle indicator and ground speed indicator.

Fig. 5 is a detailed view of a typical terrain plate.

Figure 5A is an enlarged detailed view of a section of the terrain plate.

Figure 1:
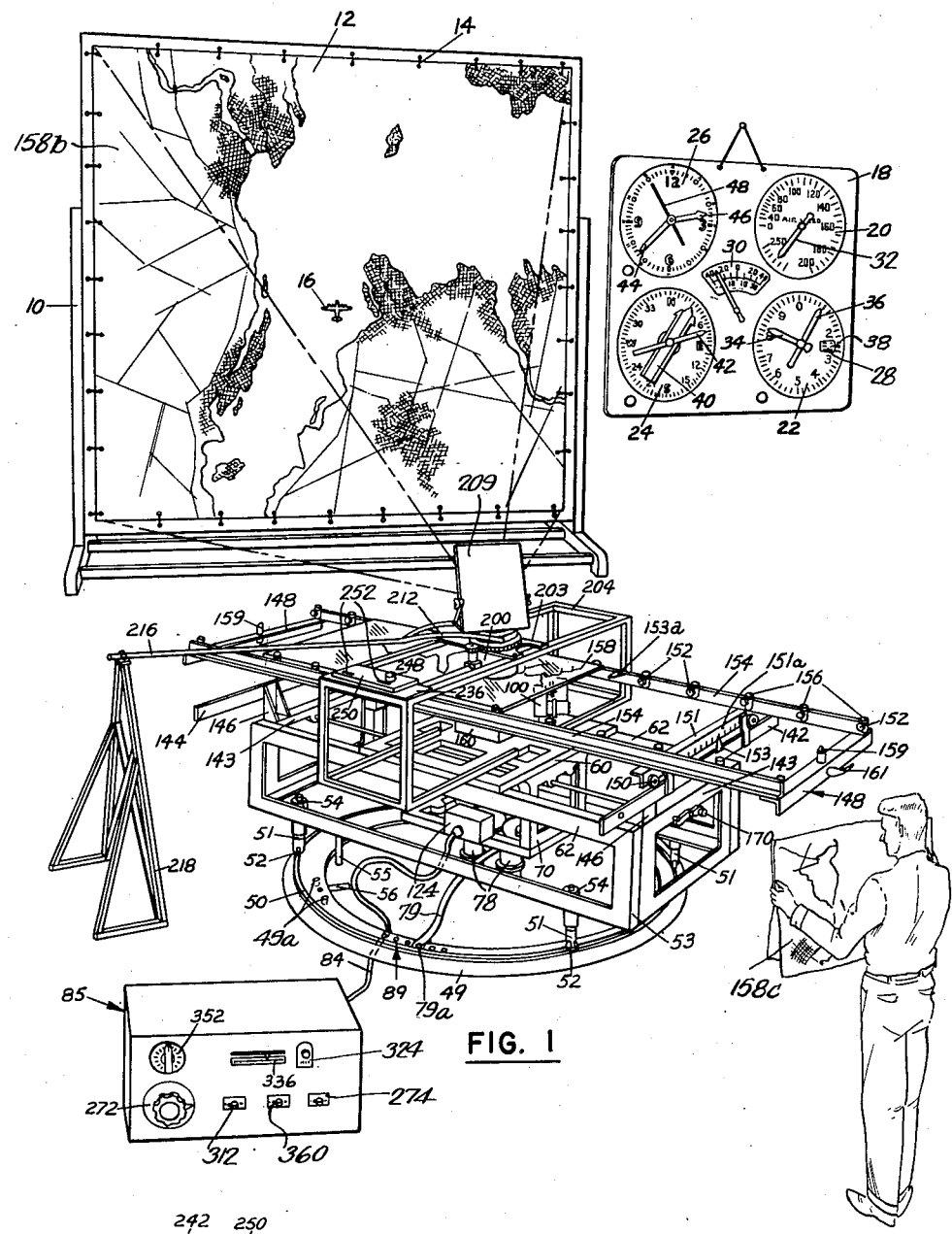
Fig. 1A is a detailed view of the plate carriage azimuth indicator and of the heading indicator.

Reference is now made to Fig. 1 which shows the general arrangement of the parts of this invention. In Fig. 1 it will be seen that a standard 10 is provided for supporting the projection screen 12 in a vertical position. The screen 12 is affixed to the standard 10 by means of lacing 14. Near the center of screen 12 is affixed the airplane silhouette 16 and it will be noticed that this silhouette is arranged so that the nose of the plane is in the direction of the upper part of screen 12.

Suitably positioned beside the screen 12 as by hanging from a suitable supporting member is a flat rectangular member 18 upon which is placed, as by painting, a dial 20 simulating the dial of an air speed indicator; a dial 22 simulating the dial of an altimeter; a dial 24 simulating the dial of a magnetic compass; and a dial 26 simulating the dial of a conventional clock. Associated with the altimeter dial 22 is a secondary dial 28 simulating the barometric pressure scale found in conventional aircraft altimeters. Positioned in the center of rectangular member 18 is the scale 30 which simulates the outside air temperature scale which in real aircraft is visible to the pilot and/or navigator.

It will be seen that the air speed dial 20 has associated therewith the hand 32 which may be positioned by the instructor to indicate the assumed indicated air speed. Two hands 34 and 36 are associated with the altimeter dial 22 in order that the instructor may indicate to the student or students the assumed altitude to the nearest hundred feet, hand 34 being set according to the assumed altitude in thousands of feet while hand 36 is set to the nearest 100 feet. The barometric pressure scale 28 is preferably movable relative to the index 38 in order that the instructor may indicate to the student or students the assumed barometric pressure. The simulated magnetic compass 24 is provided with the rotatable reference bar 40 which may be set by the instructor to indicate to the students the assumed magnetic course to be flown, just as the pilot and navigator in a real plane set a corresponding bar to indicate the magnetic course which should be flown. The rotatable hand 42 may be set to indicate to the students the magnetic course actually being flown. A minute hand 44, an hour hand 46, and a sweep second hand 48 are associated with the dial 26 of the simulated clock so that the instructor may indicate to the students the factor of assumed elapse of time. If desired a real clockwork mechanism may be used.

In the center part of Fig. 1 is shown the mechanism of this invention which is used to project the image of the ground upon the terrain screen 12. As seen in Fig. 1, a rail 49 in the form of a large ring is provided, this ring lying on the floor or ground. A track 50 is formed integrally with the rail and riding upon this track by means of four vertical legs 51 (only three shown) having flanged rollers 52 mounted in their lower ends is the terrain base frame 53. The legs 51 are rigidly held by frame 53 by means of lock nuts 54. Also rigidly held by terrain base frame 53 is a depending stop 55 which is adapted to engage the arm 56 which is pivotally affixed to rail 49. Rail 49 has an integral stop 49a on each side of the arm 56 to limit the movement of arm 56. The limited movement of arm 56 resulting from this arrangement allows the positioning of terrain base frame 53 at any position through 360° but prevents a continuous rotation of the terrain frame in order that certain electrical connections to be later described will not become disrupted.

Also seen in Fig. 1 is a horizontal casting member 60 which is affixed to the upper longitudinal members 62 of the terrain base frame 53. Casting 60 has a plurality of rectangular openings in order to lighten the unit. Depending from member 60 and rigidly affixed thereto is a boxlike frame 70. By virtue of this arrangement it will be appreciated that member 70 always turns with frame 53 relative to rail 49.

Figure 2:
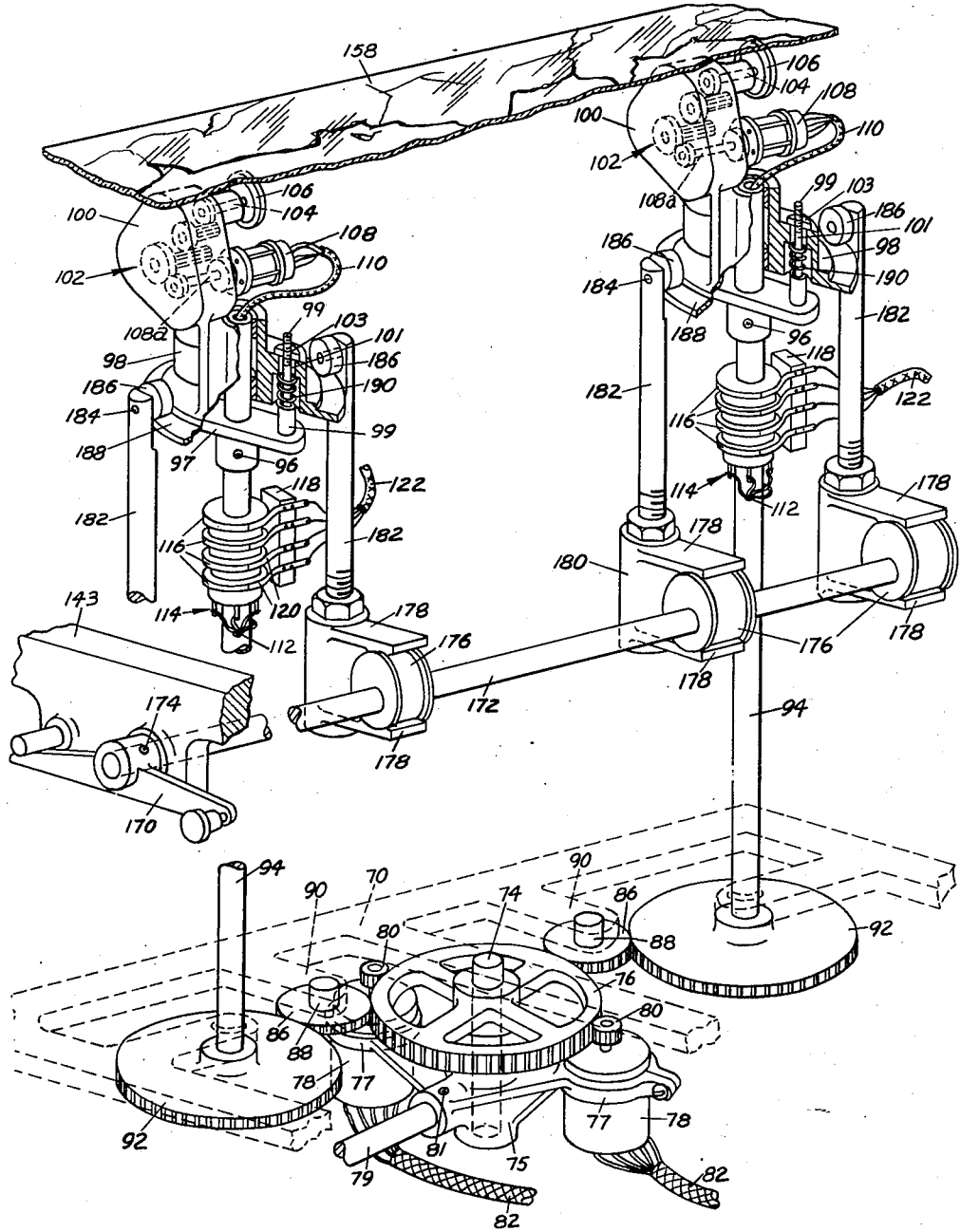
Fig. 2 is a view of the terrain plate propelling means.

In Fig. 2 the bottom part of casting 70 is shown, and as seen a shaft 74 is rigidly held by the casting. Rotatably mounted upon shaft 74 is a large spur gear 76. There are mounted adjacent gear 76 two receiver teletorques 78 each of which has affixed upon its output shaft a pinion 80 which meshes with gear 76 in order to rotate this gear. These teletorques are designated for convenience as the track receiving teletorques. It will be seen that the wires contained in cables 82 connect with each of these teletorques and cables 82 connect with junction box 124 seen in Fig. 1. At junction box 124 cables 82 may connect with a cable in large cable 84 leading from the instructor's control box 85 to junction box 124, as will later be pointed out.

Cable 84 preferably passes under the rail 49 and is long enough to allow a rotation of frame 53 through slightly more than 360 degrees.

It will be seen in Fig. 2 that gear 76 meshes with two reversing gears 86 each of which is rotatably mounted upon one of the shafts 88 which are held by extensions 90 integral with the bottom of casting 70. Each of these gears 86 meshes with one of the large spur gears 92 each of which is affixed to the bottom of one of the vertical shafts 94. Affixed to the upper end of each of the shafts 94 by means of set screws 96 is a casting 97, each of which has two integral upstanding pins 99 (only one on each casting shown) in a clearance hole 101 of a casting 98 and a lock nut 103 is provided to engage the upper threaded portion of each of the pins 99. Integral with each of the castings 98 is a housing 100 and inside each of these housings is a gear train designated generally by 102. Rotatably mounted within each of the gear housings 100 is a shaft 104 driven by its associated gear train 102 and upon the outer end of each of the shafts 104 is affixed a rubber tired driving disc 106.

From the foregoing, it will be realized that as the output shaft of the receiving teletorques 78 are moved, a rotation of the pinions 80 upon the output shafts occurs. Spur gear 76 is therefore rotated and so are idler gears 86 and the large spur gears 92 upon the lower end of the vertical shafts 94. The vertical shafts 94 will be rotated as will castings 97 and pins 99 which in turn rotate the castings 98 and housings 100. The rubber tired driving discs 106 will therefore have their positions about their vertical axes changed. It should be noticed that the vertical axes of the rubber tired discs 106 are coincident with the vertical axes of vertical shafts 94. It may therefore be concluded that the position of the rubber tired driving discs 106 about their vertical axes is at all times dependent upon the positions of the output shafts of the receiving teletorques 78.

It will be seen in Fig. 2 that the shaft 74 has rigidly affixed upon its lower end a casting 75 which has two integral clamps 77, each of which holds one of the teletorques 78. Adjusting arm 79 is held in casting 75 by means of set screw 81 and, as seen in Fig. 1, the other end of this arm may be fixed relative to rail 49 by means of a screw 79a which fits in any one of the plurality of holes 89. When the power of the teletorques 78 is on, and they are connected to their transmitter as will be later explained, a movement of arm 79 in the horizontal plane moves the teletorques 78, and pinions 80, being held from rotating by the transmitter teletorque, rotate gear 76, which, through the previously described means, rotates driving discs 106 about their vertical axes. The purpose of this adjusting arrangement is so that in installation the driving discs 106 may be properly positioned about their vertical axes.

Also seen in Fig. 2 mounted upon each of the housings 100 is a receiver teletorque 108, these teletorques being designated for convenience as the ground speed receiving teletorques. Each of these teletorques is connected to the wires in its associated cable 110 which enters the upper open end of the associated shaft 94 and makes its exit therefrom by means of one of the holes 112 drilled in these shafts. The other end of each of these wires is connected to one of the pins designated generally by 114, and each of the pins in turn is electrically connected with one of the slip rings 116. Two brush blocks each designated 118 are carried by any suitable fixed member and each of the brushes 120 carried by them is in contact with one of the slip rings 116. Each of the brushes 120 is connected to a wire contained in its associated cable 122 which connects with the junction box 124, seen in Fig. 1 to be carried by casting 70. At the junction box the cables 122 are connected to a single cable in large cable 84 which travels to the instructor's control box 85 as will be later described.

Reference is now made to Fig. 1 which shows tracks 142 and 144 which are rigidly held by brackets 146 which in turn are rigidly affixed to the upper cross pieces 143 of terrain frame 53. Positioned above the track 142 and 144 is terrain plate carriage 148 which has two cross pieces 151 (only one shown) holding in the horizontal plane the shafts upon which the four rollers 150 (only two shown) are free to turn. Rollers 150 ride upon tracks 142 and 144 and, therefore, it will be realized that the terrain plate carriage 148 can travel transverse of terrain base frame 53. The track 142 has its upper surface in the form of an inverted V and the rollers in engagement with that track are cut complementary thereto. This arrangement prevents the terrain plate carriage 148 from sliding longitudinally with respect to terrain base frame 53 and, therefore, always keeps the rollers 150 upon their tracks 142 and 144.

Rigidly affixed upon the front vertical face of cross piece 151 of terrain plate carriage 148 is scale 151a graduated in inches and rigidly affixed to track 142 is an index pointer 153. These two elements at all times indicate the position of terrain plate carriage 148 transverse of terrain base frame 53.

As also seen in Fig. 1, a plurality of guide rollers 152 are mounted by means of ball bearings for rotation in the vertical plane along the inner faces of sides 154 of the terrain plate carriage 148 and, furthermore, for each of these rollers there is a companion roller 156 similarly mounted for rotation in a horizontal plane. These rollers 152 and 156 engage the sides and bottom respectively of terrain plate 158 and provide a low friction track for moving terrain plate 158 longitudinally with respect to terrain plate carriage 148.

From the preceding description it will be seen, therefore, that the terrain plate carriage 148 may move transversely of terrain base frame 53 by means of rollers 150 and tracks 142 and 144, and inasmuch as the terrain plate 158 is held by terrain plate carriage 148 the terrain plate also may be moved transversely of terrain base frame 53. In addition, by means of rollers 152 and 156 the terrain plate 158 may move longitudinally with respect to terrain base frame 48. Furthermore, by means of the rollers 52 and track 50 of circular rail 49, the terrain base frame 53 and therefore the terrain plate 158 may be placed in any position of rotation about a vertical axis.

Suitable stops may be provided for preventing rollers 150 from running off from tracks 142 and 144 and a pair of stops 159 prevent the terrain plate 158 from rolling out of the terrain plate carriage 148. A handle 161 is associated with each of the stops 159 in order to depress the stops to facilitate putting the terrain plate in the carriage as well as removing the same.

Figure 3:
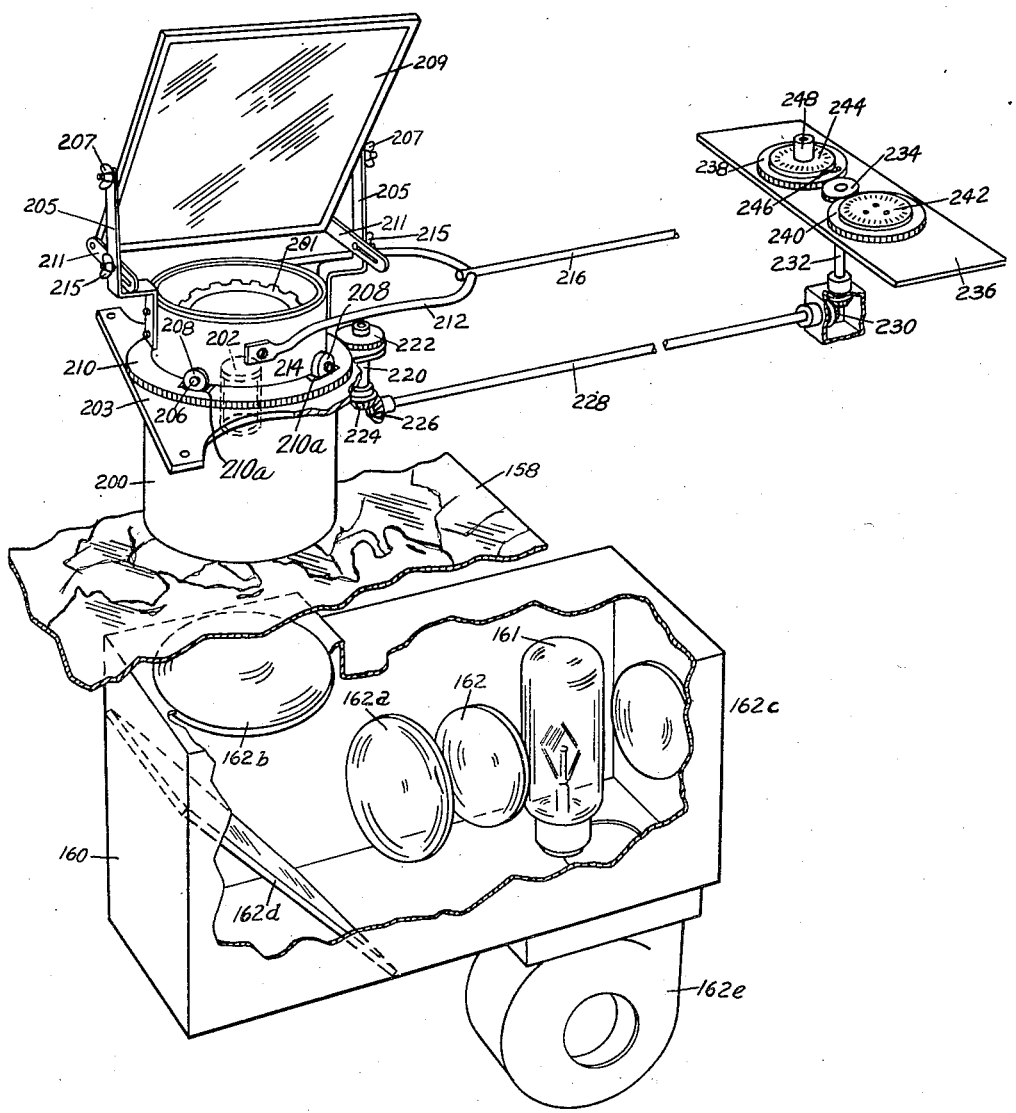
Fig. 3 is a detailed view of the projection assembly.

Referring now to Fig. 3, a housing 160 containing a source of light 161 suitably supplied with power is provided, as are three condensing lenses 162, 162a and 162b and a spherical reflector 162c. An angularly disposed mirror 162d is carried by housing 160 which also has a compartment 162e for housing a cooling fan. This housing 160 is rigidly fixed to and held by the terrain base frame 53 and casting 70 and is positioned so that the vertical axis of the third condensing lens 162b is directly above the center of circular rail 49 and coincident with the axis of rotation of frame 53.

The terrain plate 158 is positioned above the condensing lens 162b as is shown, the terrain plate carriage 148 not being shown in Fig. 3. A barrel-like member 200 carrying a projection lens housing 201 holding lens 202 is provided. A plate 203 is affixed to a box-like frame 204 seen in Fig. 1 which in turn is affixed to the rotatable base frame 53. Barrel 200 is provided with four studs 206 upon each of which is mounted a roller 208. A ring gear 210 is affixed to the barrel 200 for rotation therewith and a plurality of slots 210a are cut in the ring gear to allow the rollers 208 to contact the upper surface of plate 203.

Two brackets 205 are affixed to the barrel 200 and by means of two wing bolt arrangements 207 an angularly disposed mirror 209 is pivotally attached as shown to the upper ends of the brackets 205. A second pair of brackets 211 have one end pivotally attached to the lower end of mirror 209 while their forward ends are slotted for cooperation with a second pair of wing bolts 215 which may be used to position the brackets 211 relative to the brackets 205, thus determining the angular inclination of mirror 209.

A yoke 212 is pivotally attached to barrel 200 by screws 214 and arm 216 is integral with yoke 212. The outer end of arm 216 is held by frame 218 which in turn is suitably attached to the floor.

By virtue of this arrangement it will be appreciated that the standard 218, arm 216 and yoke 212 prevent the barrel 200, lens 202 and mirror 209 from turning, even though the terrain base frame 53, terrain plate carriage 148, terrain plate 158 and projector housing 160 and contained elements are rotated with respect to rail 49. The axis of rotation of these members is through the axis of lens 162b which coincides with the axis of lens 202, and therefore mirror 209 at all times throws the projection of plate 158 upon the screen 12.

In Fig. 3 a vertical stub shaft 220 is rotatably held by plate 203 and affixed upon the upper end of this shaft is the spur gear 222 meshing with stationary ring gear 210. Affixed upon the lower end of shaft 220 is the bevel gear 224 driving a second bevel gear 226 affixed upon the inner end of shaft 228. By means of a right angle drive 230 the vertical shaft 232 is rotated by shaft 228 as is the spur gear 234 mounted upon the upper end of shaft 232.

A plate 236 is affixed upon the top of frame 204 as seen in Fig. 1 and two gears 238 and 240 are rotatably carried by plate 236 and arranged to be rotated by gear 234.

Affixed upon gear 240 for rotation therewith is the plate azimuth scale 242 graduated from zero through 360 degrees. Resting upon gear 238 is a second heading azimuth scale 244 and a spring 246 affixed upon gear 238 bears against azimuth scale 244 so that this scale normally rotates with gear 238. However, a knob 248 is provided so that scale 244 may be rotated by the instructor relative to gear 238.

Figure 1A:
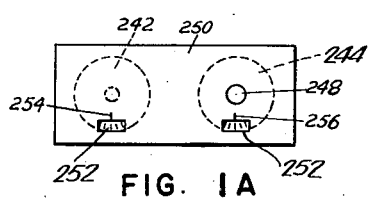

Reference is now made to Figs. 1 and 1A which show a cover 250 which is placed over the two azimuth scales. This cover has two slots 252 through which a portion of each of the azimuth scales is visible and a suitable index mark 254 or 256 is placed upon the cover 250 for cooperation with each of the azimuth scales.

By virtue of the above described arrangement, it will be appreciated that when the base frame 53 is manually rotated relative to the fixed circular rail 49, the turning of frame 53 also turns the terrain plate carriage 148 and terrain plate 158 about the vertical axis, as well as the box-like frame 204. The plate 203 also turns, and, as best seen in Fig. 3, the spur gear 222, stub shaft 220, bevel gears 224 and 226, shaft 228 and the index assembly are turned through the same angle. However, the standard 218, rod 216 and yoke 212 prevent the barrel 200 and ring gear 210 affixed thereto from turning. Consequently, the spur gear 222 is turned through an angle proportionate to the rotation of base frame 53, terrain plate carriage 148 and terrain plate 158 about a vertical axis through the projection lens 202, and the position of plate azimuth scale 242 relative to its index mark 254 is proportionately changed. Thus, by means of index mark 254 and plate azimuth scale 242, the instructor may at all times ascertain the rotatable position of base frame 53, terrain plate carriage 148 and terrain plate 158 relative to circular rail 49.

At the same time it will be appreciated that scale 244 is moved relative to its index mark 256 in response to a rotation of frame 53, frame 148 and plate 158 by an amount equal to the movement of scale 242. However, scale 244 may be moved relative to its index mark 256 independent of any such rotation by means of knob 248, for a purpose to be later described.

Reference is now made to Fig. 4 which is a detailed disclosure of the instructor's control box designated in Fig. 1 by 85. The control box has a front wall 260 and bottom 262 and includes a variac or auto-transformer 264 connected by cable 266 which travels to the junction box 124 and thence to the illumination source 161 of the projector assembly seen in Fig. 3. By means of knob 268 affixed to the rotor of auto-transformer 264, the instructor may vary the voltage across bulb 161 and hence its intensity. Thus, the intensity of the projection seen by the students upon screen 12 may be varied from zero through maximum. Zero intensity may be used to simulate instrument flying conditions and maximum, of course, to simulate contact or pilotage conditions. A suitable pointer 270 movable over voltage scale 272 at all times indicates to the instructor the voltage across lamp 161. Switch 274 is provided to disconnect auto-transformer 264 and bulb 161 from the power source, and master switch 360 governs the power to all of the units of this invention.

Also seen in Fig. 4 are a pair of curved brackets 276 suitably affixed to the bottom 262 of the instructor's control box 85. An upper track 278 and a lower track 280, both in the same vertical plane, are rigidly affixed to the curved brackets as shown. An upper pair of rollers 282 separated by a pair of longitudinally extending members 284 ride on the under side of track 278. Similarly, a second pair of rollers 286 separated by longitudinally extending members 228 ride upon the upper surface of track 280. The upper longitudinally extending member 284, as seen in Fig. 4, is provided with an extension 290 affixed thereto, and a vertical shaft 292 has its upper end rotatably mounted in extension 290. The lower end of shaft 292 is fixedly attached to the cup 294 in which the housing of the ground speed transmitting teletorque 296 is fixedly mounted. A lower shaft 298 having its vertical axis coincident with the vertical axis of shaft 292 has its upper end affixed to cup 294 and its lower end rotatably mounted in the ear 300 which is integral with the uppermost longitudinally extending member 228 as seen in Fig. 4. A torsion spring 302 is provided for exerting a predetermining clockwise torque upon shaft 292.

The input shaft of the ground speed transmitter 296 is designated 304 and fixedly mounted upon the left end of this shaft, as seen in Fig. 4, is the driven friction wheel 306. Sleeve 308 supports the input shaft 304 and is affixed to the left end of cup 294 as shown.

A synchronous motor 310 under the control of switch 312 is provided and by means of the right angle drive 314, motor 310 rotates the driving friction disc 316 at all times in one direction and at a constant speed. It will be appreciated that the torsion spring 302 maintains the driven disc 306 upon the input shaft 304 of transmitter 296 against the driving disc 316 at a predetermined pressure at all times. Driven disc 306 may be of any suitable metallic construction but the driving disc 316 comprises a metallic supporting member 318 upon which is attached a rubber driving surface 320.

Still referring to Fig. 4, it will be seen that there is provided a shaft 322 extending transversely of the instructor's control box. Upon the near end of this shaft is mounted a control knob 324 by which the shaft 322 may be rotated. Upon the far end of shaft 322 is pinion 326 which engages the rack 328 which is affixed to the upper longitudinally extending connecting member 284. Affixed at right angles to the lower longitudinally extending member 284 is the arm 330, the near end of which protrudes through a slot 332 in the front 260 of the instructor's control box. The near end of arm 330 is in the form of a pointer 334 and moves with respect to a ground speed scale 336 graduated in miles per hour of ground speed from left to right, from zero through 300, as best seen in Fig. 4A.

By virtue of this arrangement it will be appreciated that the instructor, by turning the control knob 324, can move the rack 328 longitudinally of the control box. This movement of rack 328 at the same time moves the members 284 and 228 in the same direction and this of course results in a movement of the rollers 282 and 286 along the tracks 278 and 280. The vertical shafts 292 and 298 are similarly moved as are the cup 294, ground speed transmitter 296, sleeve 308, input shaft 304 and the driven disc 306. Thus the instructor may position the driven disc 306 relative to the center of the driving disc 316 in accordance with the assumed ground speed. When the pointer 334 is opposite the zero mark upon the scale 336, the assumed ground speed is zero and the driven disc 306 is placed exactly in the center of the driving disc 316. Consequently, the rotation of the driving disc 316 will not cause a rotation of the driven disc 306 and the input shaft 304 of the ground speed transmitter 296 remains fixed relative to the housing of this transmitter.

However, when the instructor positions the pointer 334 relative to scale 336 to indicate a ground speed of a certain magnitude, the driven disc 306 is moved to the right in Fig. 4 of the center of the driving disc 316 a certain distance, the distance depending upon the magnitude of the assumed ground speed as shown by the pointer 334 relative to scale 336. It will be appreciated that the farther to the right that the driven disc 306 is placed, the greater will be the speed of rotation of the driven disc and of the input shaft 304 of the ground speed transmitter 296. The conclusion may be made that the input shaft 304 of the ground speed transmitter 296 is always rotated at a rate directly proportional to the assumed ground speed as determined by the position of pointer 334 relative to scale 336.

The ground speed transmitter 296 is connected by means of the wires contained in cable 122a which is a part of the cable 84 seen in Fig. 1 to the junction box 124 and then by cables 122 to the ground speed receiving teletorques 108 seen in Fig. 2. The speed of rotation of the output shafts 108a of the ground speed receiving teletorques 108 is, as will be well understood by those skilled in the art, at all times exactly the same as the speed of rotation of the input shaft 304 of the ground speed transmitter 296. It will be appreciated, therefore, that by means of the gear trains 102 the drive rollers 106 are always rotated at a rate directly proportional to the assumed ground speed. It will be appreciated therefore that when the drive rollers 106 contact the terrain plate 158 as shown in Fig. 2, the terrain plate 158 is always moved parallel with the planes through the disc 106 at a rate directly proportional to the assumed ground speed. The plate 158 will therefore always move relative to the projection lens 202 seen in Fig. 3 at a rate proportional to the assumed ground speed and consequently the movement of the projected image of the earth's surface upon the screen 12 relative to the fixed airplane silhouette 16 is always proportional to the assumed ground speed.

Reference is now made to Fig. 4 where there is shown the drift angle transmitting teletorque 340, having an input shaft 342 upon which is fixedly mounted the pinion 344. Spur gear 346 meshes with pinion 344 to drive the same and this spur gear is fixedly mounted upon the far end of the short shaft 348 upon the near end of which is mounted the instructor's control knob and pointer 350. Drift angle scale 352, shown in detail in Fig. 4B, is attached to the front 260 of the instructor's control box for cooperation with pointer 350. The drift angle transmitter 340 is connected by means of cable 82a in large cable 84 to junction box 124 where this cable connects to the two cables 82 shown in Fig. 2 to be connected to the drift angle receivers 78.

Referring to Fig. 4, it will be appreciated that the input shaft 342 of the drift angle transmitter 340 always rotates in a direction and through an angle depending upon the direction of movement of the knob 350 and the angle through which it is moved. The output shafts of the drift angle receivers 78 and the pinions 80 affixed upon these shafts similarly always move in a direction dependent upon the directional rotation of the input shaft 342, and they move through the same angle as does the input shaft. As previously explained the driving discs 106 are therefore rotated about their vertical axes in a direction and through an angle dependent upon the direction of movement and magnitude thereof of the pinion 80. The conclusion therefore may be drawn that the drive discs 106 are always positioned about their vertical axes, dependent upon the position of the drift angle control knob 350 seen in Fig. 4 relative to the zero drift angle mark upon scale 352. When the instructor moves the drift angle control knob 350 to indicate a left drift angle of a certain amount, the discs 106 are rotated about their vertical axes in one direction, the magnitude of their rotation being dependent upon the magnitude of the drift angle introduced by the instructor in the setting of knob 350. If the knob 350 is moved to the opposite side of the zero drift angle mark, the drive discs 106 are rotated about their vertical axes in the opposite direction, the magnitude of this rotation being dependent upon the angular movement of the knob 350 from the zero index.

Reference is now made to Fig. 2 which shows an arm 170 which is rigidly affixed to a horizontal shaft 172 by means of set screw 174. Two pairs of eccentric cams 176 are rigidly affixed upon shaft 172 and these cams engage the horizontal extensions 178 of castings 180 in which the lower end of vertical shafts 182 are held. At the upper end of each of the vertical shafts 182 is a horizontal stud 184 and upon each of these studs is mounted a roller 186 which engages the smooth upper surface of the flange 188 of each of the housings 98. The pins 99, to which reference has been previously made, it will be seen, have their upper portions turned down and placed upon each of these pins is a compression spring 190, the lower end of each of which rests upon the larger lower end of the vertical pins 99. The upper end of each of these springs presses upwardly against the top of castings 98. Lock nuts 103, previously mentioned, may be used to regulate the compression of springs 190, and it will be understood that the compressions of springs 190 normally maintain housings 98 and, therefore, discs 106 in their uppermost position, in which position the discs 106 engage the lower surface of the terrain plate 158. However, when arm 170 is turned counterclockwise from the position shown in Fig. 2, cams 176 pull vertical shafts 182 and rollers 186 downwardly, thereby compressing springs 190 and moving housings 98 and discs 106 downwardly. This disengages driving discs 106 from the underside of terrain plates 158 so that the plates may be moved freely by hand. When handle 170 is in the position shown in Fig. 2 the discs 106 are in their uppermost position, contacting the terrain plate, which is the position occupied by them when a "problem" is being run.

Reference is now made to Fig. 5 which is a detailed disclosure of a typical terrain plate 158. It will be noted that these plates have a scale in inches along one side, this scale being adapted to be used in conjunction with the pointer 153a to position the plate 158 longitudinally relative to the projection lens. The scale 151a and pointer 153 in Fig. 1 are used to position the plate transversely of the lens. In one corner of the plate appears in heavy numbers a designation 158a, in the illustrated case the designation being "55." This number indicates the true bearing of a line upon the earth's surface corresponding to the center line of the particular plate 158, and this bearing is shown by a dotted line in Fig. 5. The north-south line is also indicated in Fig. 5 by the dotted line N—S. The portion 158b of the plate corresponds to the view 158b seen in Fig. 1.

Because each plate may have a different center-line bearing it is necessary that means be provided for correctly orienting the plate 158 relative to the projecting lens 202 and drive discs 106. The following procedure may be used to properly obtain this orientation.

First, the base carriage 53 is placed with its longitudinal members 62 perpendicular to the screen 12 and by lifting the barrel 200 and ring gear 210 the gear 222 may be rotated until the plate azimuth indicator 242 reads zero. Gears 210 and 222 are then reengaged. The terrtain plate 158 is then inserted in the carriage 148 by depressing the handle 161, with the end of the plate containing the north bearing to the rear. The terrain base frame 53, terrain plate frame 148, terrain plate 158 and frame 204 are then turned until the plate azimuth indicator 242 gives the same indication as the bearing number on the plate—in the illustrated case fifty-five. When this has been accomplished the south-north bearing line on the plate is perpendicular to the screen 12, with the north end of the bearing line away from the screen 12.

With the drift angle indicator set on zero the driving discs 106 are set so their planes of rotation are perpendicular to the screen 12. Handle 170 is then set so that the discs 106 engage the under side of plate 158. The illumination source is energized, and the desired ground speed introduced. The friction discs 106 turn clockwise as seen from the left in Fig. 1 at a rate proportional to the introduced ground speed. The plate therefore moves directly toward the screen at a rate proportional to the assumed ground speed and the projected image corresponding to the mosaic on plate 158 moves from the top of the screen directly downward, new portions of the projected terrain image appearing at the top as the portions at the bottom disappear. The student or students are provided with a map 158c corresponding to the mosaic territory on the plate 158.

With the end of the terrain plate representing north moving toward the projection lens 202 and the plate moving along the south-north bearing line it is clear that the image on the screen 12 moves downwardly relative to the airplane silhouette 16 just as the corresponding terrain would move relative to an airplane flying due north. Consequently the assumed heading is due north or zero degrees, and by means of knob 248 the heading scale 244 is set to indicate zero.

Now let us assume that the instructor desires to simulate a turning of the airplane through ninety degrees to the right. The instructor may manually move the terrain base frame 53, terrain carriage 148 and terrain plate 158 counter-clockwise through ninety degrees at which point the heading indicator indicates "90." When the heading indicator so registers the west-east line on the plate 158 is perpendicular to the screen 12, the plate moving from the west end with respect to the projector lens toward the east end. The plane of rotation of the discs 106 is unchanged, and therefore the image on the screen moves with respect to the airplane silhouette just as the corresponding ground would apparently move with respect to a plane flying due east.

Now let us assume that the instructor desires to simulate the effects of a wind from the left which would result in a drift to the right of ten degrees relative to the heading of the plane. The instructor turns the drift angle control knob 350 clockwise relative to the scale 352 to the "10" mark. By means of drift angle transmitter 340 and the drift angle receivers 78 the driving discs 106 are rotated about their vertical axes clockwise through ten degrees. The plate 158 will therefore not move directly toward the screen 12 but it will move at an angle of ten degrees to a perpendicular to the screen, and the plate 158 will move along the bearing line 280 degrees— 100 degrees with the 100 degree end toward the rear. The projected image will no longer move directly down the screen 12, but will move from the top to the bottom with a sidewise movement of ten degrees to the left. Thus the movement of the projected image relative to the silhouette 16 exactly simulates the apparent movement of the terrain relative to a plane in actual flight flying over the represented terrain with a heading of ninety degrees in the presence of a wind from the left which would produce a right drift of ten degrees.

Next, assuming that the instructor desires to correct the assumed heading to compensate for the assumed drift so that the track (course actually flown over the ground) remains 90 degrees, the instructor, by means of a computer can compute the wind-correction angle for the assumed conditions of flight and thus ascertain the required heading and turn the terrain base carriage 53, terrain plate carriage 148 and terrain plate 158 clockwise until the heading indicator 244 indicates the required heading. At the same time the instructor must compute the new drift angle and set the drift-angle control knob 350 accordingly. These steps having been accomplished the projection upon the screen 12 will move downward and to the left, and the movements thereof relative to the silhouette will be exactly the same as the relative movements of the terrain and an airplane flying a track of ninety degrees under conditions corresponding to the assumed air speed, heading and wind conditions.

In the event driving discs 106 are in a plane perpendicular to the screen 12 and the longitudinal members 154 of terrain plate carriage 148 are also perpendicular to the screen 12, the rotation of discs 106 will merely cause terrain plate 158 to move along rollers 152 and 156, and hence relative to the projection lens 202. In the event the drive discs are in a plane perpendicular to screen 12 and members 154 are parallel to the screen 12, the rotation of discs 106 will not cause plate 158 to move along rollers 152 and 156, but the carriage 148 moves by means of rollers 150 upon tracks 142 and 144. For intermediate positions the plate 158 may move in the rollers 152 and 156 and the carriage 148 may simultaneously move on the rollers 150.

With the apparatus of this invention numerous demonstrations, in addition to those outlined above, and numerous navigational problems may be simulated. For example, assuming that the instructor desires to teach the students simple map reading, the mechanism may be properly oriented for plate azimuth and heading and the students may be given maps corresponding to the terrain to be projected. They may be required to locate upon their maps the assumed position above the ground of the airplane silhouette and to indicate their positions on their maps from time to time. They may be required to check the length of time that it will take to reach a given destination, using as the basis for their calculations the elapsed time of travel between two points previously ascertained by them. Poor visibility conditions may be simulated by providing low intensity projection, and flying at different altitudes may be simulated by changing the scale of the mosaic upon the terrain plates.

Dead reckoning problems may be practiced by the instructor properly orienting the apparatus of the invention, setting the instruments shown in Fig. 1 to the desired settings but not giving the students the assumed wind speed and direction. The instructor can calculate the ground speed and drift angle and introduce these factors into the apparatus. The apparatus may be set in operation and the students required to ascertain their ground speed, track and the wind speed and direction. They may then be required to inform the instructor of the heading which must be flown to reach a certain destination, and at what time they will reach the destination. The instructor may properly orient the apparatus for this new heading, and the accuracy of the student's calculations may thus be tested.

Different factors may be omitted from the information given to the students, and they may be required to calculate the unknown quantities, as will be well understood by those skilled in the art of navigation.

It seems clear that by providing terrain plates with a photographic mosaic of a target area, valuable training may be given bombing crews in target identification.

Practice in taking drift sights may be obtained by mounting such sights in front of the screen 12. The sights may be trained upon the screen, and the sight taken by using the moving image on the screen 12.

A preferred embodiment only of my invention has been disclosed and only some of its uses illustrated. The following claims are intended to cover such modifications as do not depart from the substance of my invention.

I claim:

1. In a device for teaching the art of navigation the combination of a light source; a large, rigid projection plate bearing an image representing a portion of the earth's surface; a projection screen; means for producing relative movement between said projection plate and said light source whereby the projection upon said screen moves; a dial graduated in terms of assumed drift angle and a pointer associated with said dial; means operated in accordance with the movements of said pointer relative to said dial for changing the relative direction of movement between said plate and light source by an angular amount equal to the change in setting of said pointer relative to said dial; a second dial graduated in terms of assumed miles per hour ground speed and a second pointer associated with said second dial; and means operated in accordance with the movements of said second pointer relative to said second dial for causing said plate to move relative to said light source at a rate proportional to the setting of said second pointer relative to said second dial.

2. In a device for teaching the art of navigation the combination of a light source; a large, rigid projection plate bearing an image representing a portion of the earth's surface; a projection screen; means for producing relative movement between said projection plate and said light source whereby the projection upon said screen moves; a dial graduated in terms of assumed drift angle and a pointer associated with said dial; means operated in accordance with the movements of said pointer relative to said dial for changing the relative direction of movement between said plate and light source by an angular amount equal to the change in setting of said pointer relative to said dial; a second dial graduated in terms of assumed miles per hour ground speed and a second pointer associated with said second dial; means operated in accordance with the movements of said second pointer relative to said second dial for causing said plate to move relative to said light source at a rate proportional to the setting of said second pointer relative to said second dial; and indicating means associated with said screen for indicating by reference thereto and to the moving projection an assumed position of an aircraft above the surface of the earth.

3. In a device for teaching the art of navigation the combination of a light source; a large, rigid projection plate bearing an image representing a portion of the earth's surface; a projection screen; means for producing relative movement between said projection plate and said light source whereby the projection upon said screen moves; a dial graduated in terms of assumed drift angle and a pointer associated with said dial; means operated in accordance with the movements of said pointer relative to said dial for changing the relative direction of movement between said plate and light source by an angular amount equal to the change in setting of said pointer relative to said dial; a second dial graduated in terms of assumed miles per hour ground speed and a second pointer associated with said second dial; means operated in accordance with the movements of said second pointer relative to said second dial for causing said plate to move relative to said light source at a rate proportional to the setting of said second pointer relative to said second dial; and an aircraft simulating element including means for indicating the assumed direction of flight of a plane associated with said screen for indicating by reference thereto and to the moving projection an assumed position of the plane above the surface of the earth as well as the assumed direction of travel of the plane relative to the ground represented by the projection.

WILLIAM W. WOOD, JR.

REFERENCES CITED

The following references are of record in the file of this patent:

UNITED STATES PATENTS

| Number | Name | Date |
|---|---|---|
| 1,102,595 | Knight | July 7, 1914 |
| 1,256,147 | McCormick | Feb. 12, 1918 |
| 1,545,674 | MacKay | July 14, 1925 |
| 2,027,028 | Douden | Jan. 7, 1936 |
| 2,066,949 | Ruiz | Jan. 5, 1937 |
| 2,164,412 | Koster | July 4, 1939 |
| 2,267,649 | Graves | Dec. 23, 1941 |
| 2,271,296 | Hargrave | Jan. 27, 1942 |
| 2,279,463 | Hopkins | Apr. 14, 1942 |
| 2,321,799 | Cone | June 15, 1943 |
| 2,329,612 | Hill | Sept. 14, 1943 |
| 2,385,291 | Link | Sept. 18, 1945 |
| 2,387,749 | Darnell | Oct. 30, 1945 |
| 2,428,870 | Essex | Oct. 14, 1947 |